United States Patent
Marquès et al.

(10) Patent No.: US 11,433,791 B2
(45) Date of Patent: Sep. 6, 2022

(54) TRIM ASSEMBLY FOR A VEHICLE SEAT AND METHOD OF FORMING

(71) Applicant: Lear Corporation, Southfield, MI (US)

(72) Inventors: José Marquès, Vaux sus Seine (FR); Nathalie Navarro, Viroflay (FR)

(73) Assignee: Lear Corporation, Southfield, MI (US)

( * ) Notice: Subject to any disclaimer, the term of this patent is extended or adjusted under 35 U.S.C. 154(b) by 100 days.

(21) Appl. No.: 16/844,573

(22) Filed: Apr. 9, 2020

(65) Prior Publication Data
US 2021/0316644 A1 Oct. 14, 2021

(51) Int. Cl.
*B60N 2/58* (2006.01)

(52) U.S. Cl.
CPC ......... *B60N 2/5833* (2013.01); *B60N 2/5891* (2013.01)

(58) Field of Classification Search
USPC ..................................................... 297/218.2
See application file for complete search history.

(56) References Cited

U.S. PATENT DOCUMENTS

| | | | | |
|---|---|---|---|---|
| 2,801,682 A * | 8/1957 | Fridolph | .................. | A47C 7/34 5/408 |
| 3,961,823 A * | 6/1976 | Caudill, Jr. | .......... | B60N 2/5825 297/452.6 |
| 4,375,107 A * | 3/1983 | Bachtiger | ................. | A41B 5/00 2/139 |
| 5,562,309 A * | 10/1996 | Brink | ....................... | B42D 1/10 281/31 |
| 5,641,204 A * | 6/1997 | Lhuissier | ............. | B60N 2/5825 297/452.48 |
| 6,067,775 A * | 5/2000 | O'Connor | .......... | B65H 45/1015 53/436 |
| 6,336,307 B1 * | 1/2002 | O'Connor | .............. | B65D 85/67 53/529 |
| 7,487,575 B2 * | 2/2009 | Smith | ....................... | B68G 7/12 24/297 |
| 7,588,290 B2 * | 9/2009 | Takezawa | ............. | B60N 2/5883 297/219.1 |
| 7,946,649 B2 * | 5/2011 | Galbreath | ............ | B60N 2/5825 297/218.4 |
| 8,429,858 B1 * | 4/2013 | Robinson | ................ | E04H 1/005 52/63 |
| 8,919,878 B2 * | 12/2014 | Sakamoto | ............ | B60N 2/5825 297/452.59 |
| 10,933,783 B1 * | 3/2021 | Hamlin | ................. | B60N 2/6036 |

(Continued)

FOREIGN PATENT DOCUMENTS

WO WO-2016047324 A1 * 3/2016 ............. A47C 31/02
WO WO-2017138196 A1 * 8/2017 ........... B60N 2/5825

*Primary Examiner* — David E Allred
(74) *Attorney, Agent, or Firm* — Brooks Kushman PC

(57) ABSTRACT

A trim cover assembly for a vehicle seat assembly, a vehicle seat assembly, and a method of assembling the trim cover are provided. The trim cover assembly has a first trim member with a first surface to form a seating surface and a second surface opposite to the first surface. A second trim member is provided for connection to a seat member, and has first and second side regions each extending between first and second end regions. The first and second end regions are connected adjacent to first and second edges of the first trim member, respectively. A central region of the second trim member is connected to the second surface of the first trim member via a first seam.

18 Claims, 3 Drawing Sheets

(56) References Cited

U.S. PATENT DOCUMENTS

| | | | |
|---|---|---|---|
| 2002/0063452 A1* | 5/2002 | Harada | B60N 2/5825 297/216.13 |
| 2004/0124207 A1* | 7/2004 | Tramontina | B65D 83/0805 221/305 |
| 2008/0258523 A1* | 10/2008 | Santin | B60N 2/5825 29/428 |
| 2009/0135014 A1* | 5/2009 | Bleckmann | G08B 13/2434 340/572.8 |
| 2010/0314922 A1* | 12/2010 | Poulakis | B60N 2/5825 428/36.1 |
| 2012/0031317 A1* | 2/2012 | Lafferty | B60N 2/5883 112/400 |
| 2012/0133194 A1 | 5/2012 | Takehara et al. | |
| 2013/0099549 A1* | 4/2013 | Tanaka | B60N 2/5825 297/452.38 |
| 2014/0352117 A1* | 12/2014 | Murasaki | B60N 2/5825 24/581.11 |
| 2015/0165359 A1* | 6/2015 | Chamberlain | B23P 19/04 55/494 |
| 2015/0307001 A1* | 10/2015 | Sahashi | B60N 2/5825 297/218.2 |
| 2016/0031350 A1 | 2/2016 | Smith | |
| 2016/0052433 A1* | 2/2016 | Ono | B60N 2/5825 297/452.61 |
| 2017/0250447 A1* | 8/2017 | Jiang | H01M 10/0436 |
| 2018/0194254 A1* | 7/2018 | Fujikake | B68G 7/05 |
| 2019/0135147 A1 | 5/2019 | Lewis et al. | |
| 2019/0161266 A1* | 5/2019 | Miller | B65D 5/58 |
| 2019/0254440 A1* | 8/2019 | Gates | A47C 17/02 |
| 2020/0046137 A1* | 2/2020 | Ohtsu | B60N 2/5816 |
| 2021/0146813 A1* | 5/2021 | Marqu S | B60N 2/68 |

* cited by examiner

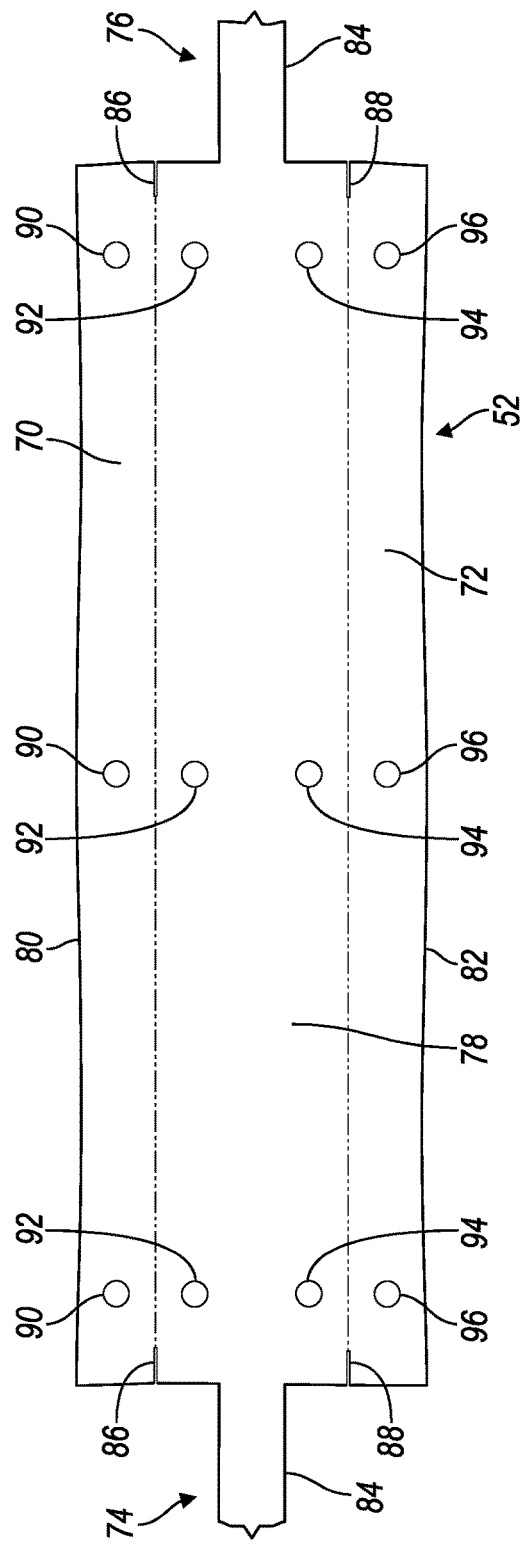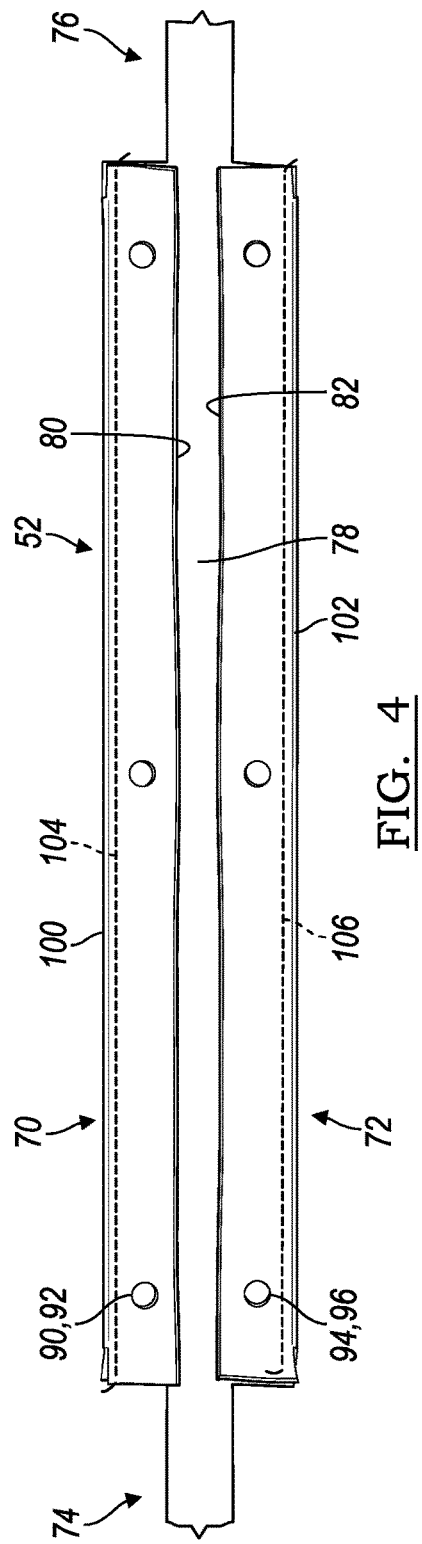

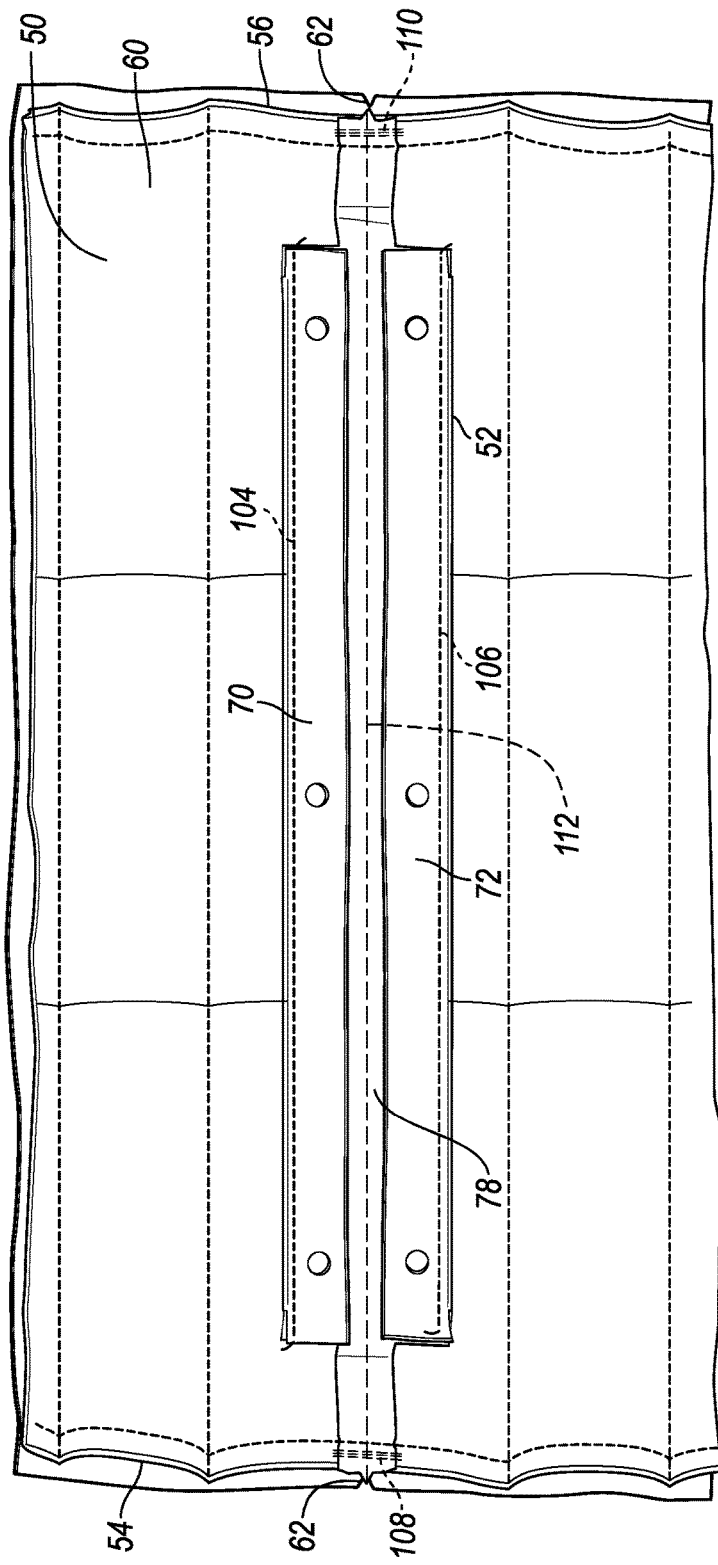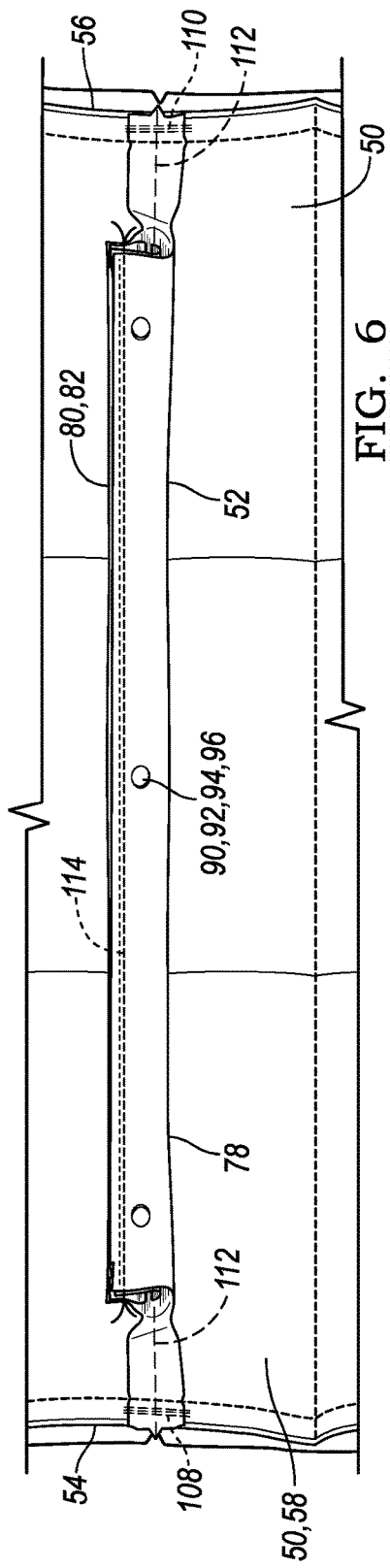

TRIM ASSEMBLY FOR A VEHICLE SEAT AND METHOD OF FORMING

TECHNICAL FIELD

Various embodiments relate to a trim assembly for a vehicle seat assembly, and a method of forming the trim assembly.

BACKGROUND

A vehicle seat assembly may be provided with a trim assembly. Examples of a trim assembly and vehicle seat assembly may be found in U.S. Patent Publication No. 2016/0031350 A1, U.S. Patent Publication No. 2019/0135147 A1, and U.S. Patent Publication No. 2012/0133194 A1.

SUMMARY

In an embodiment, a vehicle seat assembly is provided with a seat member with a seating surface, and the seating surface defining a groove extending thereacross. A first trim member has a first edge and a second edge opposite to the first edge, and a first surface and a second surface opposite to the first surface. The first surface extends between the first and second edges, and the second surface in contact with the seat member. A second trim member has a first side region and a second side region each extending from a first end region to a second end region of the second trim member. The first end region is connected adjacent to the first edge of the first trim member, and the second end region is connected adjacent to the second edge of the first trim member. The second trim member has a central region positioned between the first and second side regions, and the central region of the second trim member is connected to the second surface of the first trim member via a first seam extending from the first end region to the second end region of the second trim member. The first and second side regions of the second trim member are connected to one another and extend away from the first trim member. The first and second side regions of the second trim member are received into the groove and are connected to the seat member.

In a further embodiment, the first side region of the second trim member defines a first series of apertures spaced apart from one another and extending from the first end region to the second end region of the second trim member. The second side region of the second trim member defines a second series of apertures spaced apart from one another and extending from the first end region to the second end region of the second trim member. The second series of apertures are aligned with the first series of apertures. The vehicle seat assembly has a series of fasteners, with each fastener extending through the seat member and through respective apertures of the first and second series of apertures to connect the second trim member to the seat member.

In a yet further embodiment, the series of fasteners include rings.

In another further embodiment, the first side region of the second trim member is provided with one of a hook fastener and a loop fastener. The seating surface of the seat member is provided with the other of the hook fastener and the loop fastener positioned within the groove. The hook fastener cooperates with the loop fastener to connect the second trim member to the seat member.

In another embodiment, a trim cover assembly is provided with a first trim member having a first edge and a second edge opposite to the first edge, and a first surface and a second surface opposite to the first surface. The first surface extends between the first and second edges and forms a seating surface. A second trim member for connection to a vehicle seat member is provided and has a first side region and a second side region opposite thereto. The first and second side regions each extend between a first end region and a second end region of the second trim member. The first end region is connected adjacent to the first edge of the first trim member, and the second end region is connected adjacent to the second edge of the first trim member. A central region of the second trim member is connected to the second surface of the first trim member via a first seam extending from the first end region to the second end region of the second trim member. The central region of the second trim member is positioned between the first and second side regions of the second trim member.

In a further embodiment, the first and second side regions of the trim assembly are connected to one another and extend away from the first trim member.

In another further embodiment, the first end region is connected adjacent to the first edge via a second seam, and the second end region is connected adjacent to the second edge via a third seam. The first seam extends substantially transversely to the second and third seams.

In a further embodiment, the first side region defines a first edge of the second trim member, and the first edge is positioned adjacent to the central region to form a first fold. The second side region defines a second edge of the second trim member, and the second edge is positioned adjacent to the central region to form a second fold.

In a yet further embodiment, the second trim member defines a first slit and a second slit extending inwardly from the first and second end regions, respectively. The first and second slits are positioned between the central region and the first edge, and are positioned to locate the first fold.

In another yet further embodiment, the first fold has a second seam extending from the first end region to the second end region of the second trim member to retain the first fold. The second fold has a third seam extending from the first end region to the second end region of the second trim member to retain the second fold.

In a yet further embodiment, the first fold and the second fold are connected to one another via a second seam extending through the first trim member adjacent to the first and second folds.

In another further embodiment, the first side region defines a first series of apertures spaced apart from one another, and the second side region defines a second series of apertures spaced apart from one another. The first and second series of apertures are positioned to align with one another, and are sized to receive a series of fasteners to connect the second trim member to an underlying support surface of a seat.

In a further embodiment, the first and second edges of the first trim member form one of a pair of opposed notches and a pair of opposed tabs, respectively. The first and second end regions of the second trim member form the other of the pair of opposed notches and the pair of opposed tabs, respectively. The pair of opposed notches and the pair of opposed tabs cooperate with one another to locate the second trim member relative to the first trim member when connecting the second trim member to the first trim member.

In another further embodiment, the second trim member is formed from a non-woven fabric.

In an embodiment, a method of assembling a trim cover is provided. A first trim member is provided and has a first edge and a second edge opposite to the first edge, and a first surface and a second surface opposite to the first surface. The first surface extends between the first and second edges to form a seating surface. A second trim member is provided and has a first side region and a second side region each extending from a first end region to a second end region of the second trim member. The second trim member is arranged on the second surface of the first trim member. The first end region of the second trim member is attached adjacent to the first edge of the first trim member from the second surface of the first trim member. The second end region of the second trim member is attached adjacent to the second edge of the first trim member from the second surface of the first trim member. A central region of the second trim member is sewed to the first trim member from the first surface of the first trim member such that a first seam extends from the first end region to the second end region. The central region is positioned between the first and second side regions such that the first and second side regions extend away from the first trim member. The central region is sewed subsequent to attaching the first and second end regions.

In a further embodiment, attaching the first side region to the second side region includes sewing a second seam extending from the first end region to the second end region of the second trim member. The second seam is spaced apart from the first seam, and the second seam is formed subsequent to the first seam.

In another further embodiment, the first side region is folded such that an edge associated with the first side region is adjacent to the central region. The first side region is sewed to itself to retain the fold in the first side region. The second side region is folded such that an edge associated with the second side region is adjacent to the central region. The second side region is sewed to itself to retain the fold in the second side region.

In a yet further embodiment, a first slit and a second slit are formed at the first and second end regions of the second trim member, respectively. A third slit and a fourth slit are formed at the first and second end regions of the second trim member, respectively. The first side region is folded at the first and second slits such that a first series of apertures and a second series of apertures extending through the first side region are aligned with one another. The second side region is folded at the third and fourth slits such that a third series of apertures and a fourth series of apertures extending through the first side region are aligned with one another.

In a further embodiment, arranging the second trim member on the second surface of the first trim member includes positioning a pair of opposed tabs formed by one of the first and second trim members into a pair of opposed notches formed by the other of the first and second trim members to locate the second trim member relative to the first trim member. The second trim member is arranged prior to sewing the first and second end regions and the central region.

In another further embodiment, the first and second side regions are positioned into a groove defined by a vehicle seat member. The first and second side regions are fastened to the vehicle seat member to locate and retain the first trim member relative to the vehicle seat member.

BRIEF DESCRIPTION OF THE DRAWINGS

FIG. 3 illustrates a perspective view of a second trim member for use with the trim assembly of FIG. 1 according to an embodiment;

FIG. 4 illustrates a perspective view of the second trim member of FIG. 3 prior to assembly to the first trim member;

FIG. 5 illustrates a rear perspective view of the trim assembly of FIG. 1 with the second trim member attached to the first trim member; and FIG. 6 illustrates another rear perspective view of the trim assembly of FIG. 1 with the second trim member attached to the first trim member.

DETAILED DESCRIPTION

As required, detailed embodiments of the present invention are disclosed herein; however, it is to be understood that the disclosed embodiments are merely examples and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
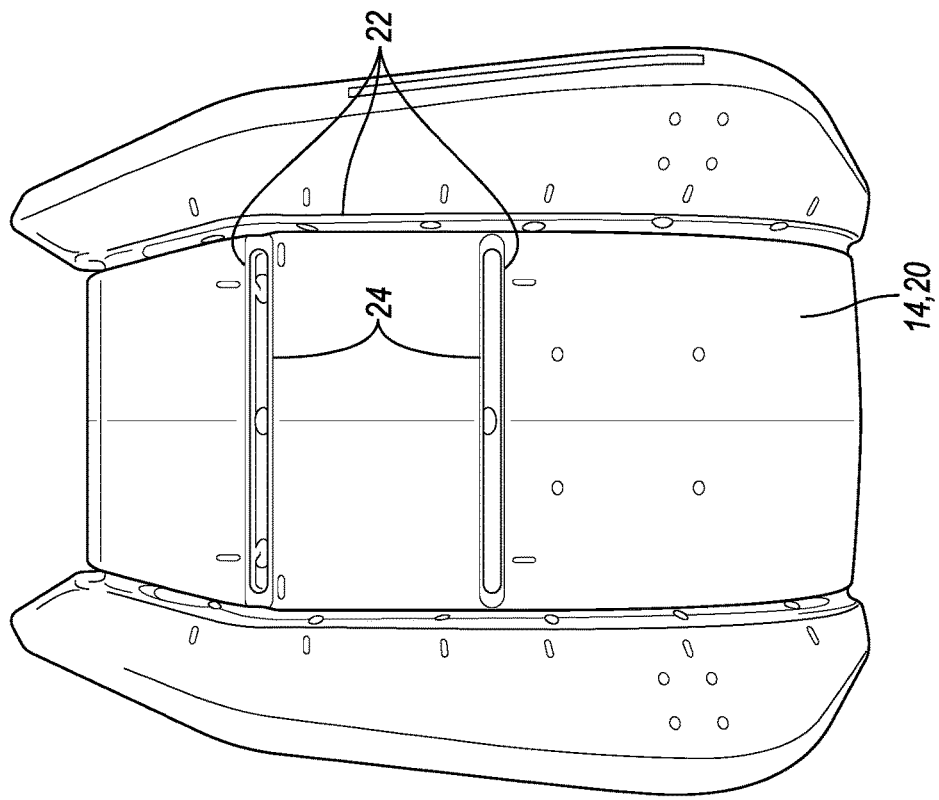
FIG. 1 illustrates a front perspective view of a vehicle seat assembly with a trim assembly and a first trim member according to an embodiment.
Figure 2:
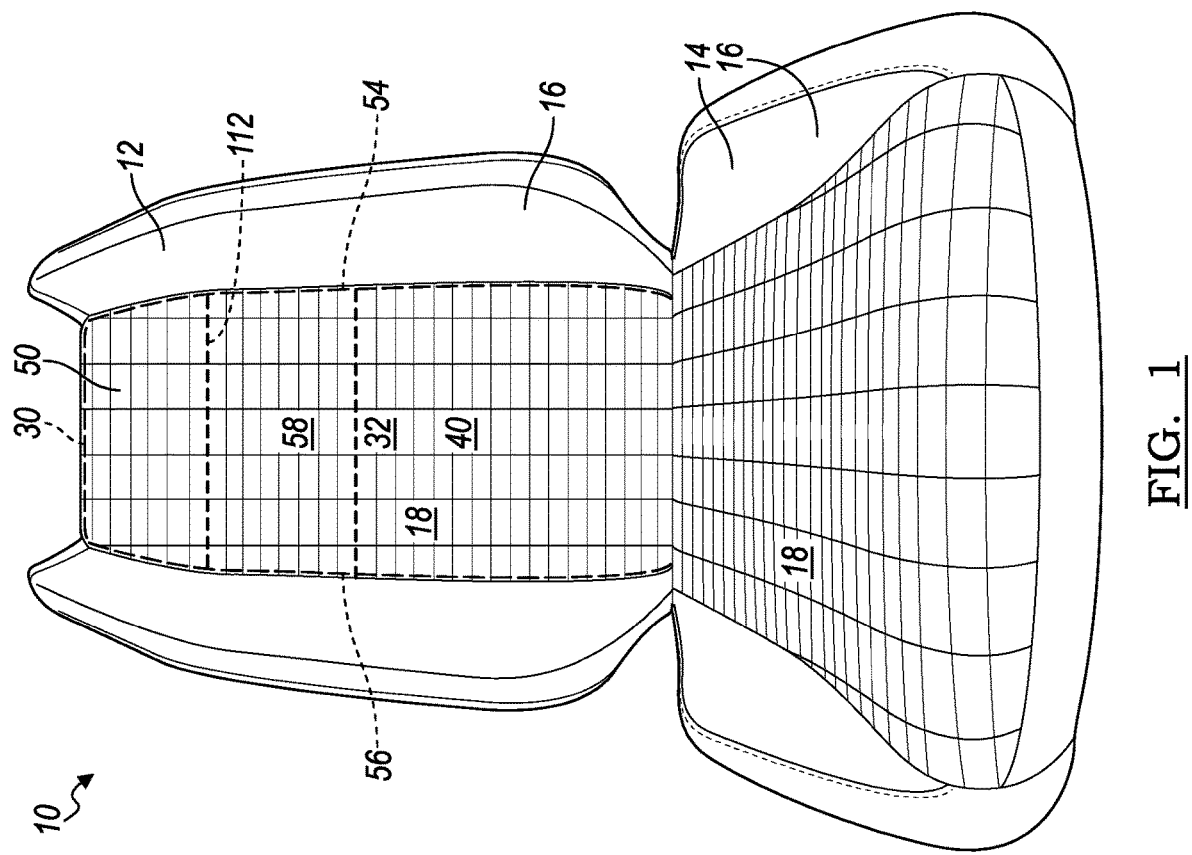
FIG. 2 illustrates a perspective view of a seat member of the vehicle seat assembly of FIG. 1.

FIGS. 1-2 illustrates a vehicle seat assembly 10 with first and second seat members 12, 14, such as a seat base 12 and a seat back 14, respectively, that cooperate to form a seating surface 16 for a vehicle occupant. The vehicle seat assembly 10 of FIG. 1 is illustrated as being covered with trim 18. FIG. 2 illustrates the seat member or seat back 14 of FIG. 1 as being uncovered or without trim 18. Each of the seat members 12, 14 include a substrate or frame structure, cushioning 20, and trim covering.

As shown in FIG. 2, each seat member 12, 14, is each covered with cushion material 20. In one example, the cushions 20 are provided by a foam material or the like. The cushions 20 may be provided with grooves 22 extending on the seating surface side of the cushion and seat member. In one example, and as shown, one or more of the grooves 24 may extend transversely across the seat member.

The trim covering 18 may be provided by one or more assemblies or pieces that are attached to the underlying seat member using fastener(s). The trim assemblies may be fastened or anchored to the vehicle seat member into the grooves 22 using the fasteners. The fasteners may be provided by rings, hook and look fasteners, clip or push in fasteners, and the like.

The disclosed trim assembly 30 and method may be used with a seat back 14, a seat base 12 or both. For simplicity, a trim assembly and a method associated with the trim assembly is described with respect to use with a seat back 14 by way of example; however, the trim assembly and method may likewise be applied to use with a seat base 12, with a seat back and base in combination, or with another vehicle component or other seating device requiring a trim cover.

A trim cover assembly 30 may be provided as a panel for use with the vehicle seat assembly and as a part of the overall trim 18. In the example described herein, the trim cover assembly 30 forms the trim and seating surface for the central region 32 of the seat back 14. As such, the trim assembly 30 may extend over one or more grooves 24 in the seat member. These grooves 24 are used to anchor the trim assembly 30 to the underlying seat member 14 and prevent sagging, bagginess, or the like of the trim assembly 30 as it extends over a large surface area. In some examples, and as shown herein, the seating surface 40 of the trim assembly 30 may be provided with a pattern. In the example shown, the pattern is provided with linear elements such as stripes or lines that extend transversely across the seating surface 40, and it is desirable to have these linear elements aligned with the underlying grooves 24 to provide an improved aesthetic appearance for the seat assembly 10. Conventional methods of attaching the trim assembly 30 to the seat member 14 may be difficult to provide such an alignment.

Referring to FIGS. 1 and 3-6, the trim cover assembly 30 has a first trim member 50 and a second trim member 52. The first and second trim members 50, 52 may each be formed from a piece of fabric. In one example, and as shown, the first trim member 50 is formed from a woven pattern or piece of fabric, and the second trim member 52 is formed from a non-woven pattern or piece of fabric. In other examples, and purposes of the disclosure, the first and/or second trim members 50, 52 may be formed from various fabrics, such as fabrics used in vehicle interiors, and includes woven cloth, non-woven cloth, vinyl, leather, faux leather, and the like.

The first trim member 50 is indicated by the outline as shown in FIG. 1. The first trim member 50 has a first edge 54 and a second edge 56 opposite to the first edge. The first trim member has a first surface 58 and a second surface 60 opposite to the first surface. The first surface 58 extends between the first and second edges 54, 56 and is a finished surface, such as the surface 40 with the pattern as shown in FIG. 1. The second surface 60 is in contact with the underlying seat member and cushion 20.

As shown in FIG. 1, the first surface 58 of the first trim member 50 provides an outer face or A-face facing the vehicle occupant and for use as a seating surface 40. The second surface 60 of the first trim member 50 is shown in FIGS. 5-6 and provides an inner face or B-face facing away from the vehicle occupant.

The first trim member 50 may be provided with a pair of opposed notches 62 that extend inwardly from the first and second edges 54, 56, as shown in FIG. 5. In other examples, the first trim member 50 may alternatively be provided with a pair of opposed tabs or other locating features extending from the first and second edges 54, 56.

Referring to FIG. 3, the second trim member 52 has a first side region 70 and a second side region 72. Each side region 70, 72 extends from a first end region 74 to a second end region 76 of the second trim member. The second trim member 52 has a central region 78 positioned between the first and second side regions 70, 72 and extending from the first end region 74 to the second end region 76.

The first side region 70 extends outwardly from the central region 78 to a first edge 80 of the second trim member. The second side region 72 extends outwardly from the central region 78 to a second edge 82 of the second trim member.

The second trim member 52 has a pair of opposed tabs 84 extending outwardly from the first and second end regions 74, 76, respectively. In other examples, the second trim member 52 may alternatively be provided with a pair of opposed notches or other locating features at the first and second end regions. The tabs 84 on the second trim member 52 are used to align the second trim member 52 relative to the first trim member 50, e.g. when sewing or fastening the second trim member to the first trim member. For example, the second trim member 52 may be attached or sewn blind to the first trim member 50, and the tabs 84 allow for the axis to be maintained while avoiding or minimizing skew or deviation in the seam. Furthermore, the tabs 84 may be aligned with or otherwise linked to either end of the transverse groove on the underlying cushion. For example, the groove on the cushion may have a filled or other terminating region at each end, and the tabs 84 may be aligned or linked with the ends of the associated groove.

The second trim member 52 has a first pair of slits and a second pair of slits 86, 88. The first pair of slits 86 is defined by the first side region 70 and extend inwardly from the first and second end regions 74, 76, respectively. The first pair of slits 86 is positioned between the central region 78 and the first edge 80 of the second trim member. The second pair of slits 88 is defined by the second side region 72 and extend inwardly from the first and second end regions 74, 76, respectively. The second pair of slits 88 is positioned between the central region 78 and the second edge 82 of the second trim member.

In one example, and as shown, the first side region 70 of the second trim member defines a first series of apertures 90 and a second series of apertures 92 spaced apart from one another and extending from the first end region 74 to the second end region 76 of the second trim member. The second side region 72 of the second trim member defines a third series of apertures 94 and a fourth series of apertures 96 spaced apart from one another and extending from the first end region 74 to the second end region 76 of the second trim member. The first, second, third and fourth series of apertures 90, 92, 94, 96 extend through the second trim member 52 and are aligned with one another.

A method according to the present disclosure is provided to assemble the second trim member 52 to the first trim member 50 and form a trim assembly 30. The method may additionally include connecting or attaching the trim assembly 30 to a seat member, such as a seat member 12, 14 for a vehicle seat assembly. In other examples, various steps in the method may be omitted, added, rearranged into another order, or performed sequentially or simultaneously.

In a first step, a first trim member is provided, and in the present example, is the first trim member 50 as is shown in FIGS. 1, 5, and 6. In a second step, a second trim member is provided, and in the present example, is the second trim member 52 as is shown in FIG. 3.

With respect to FIG. 4, in a third step, the first side region 70 of the second trim member is folded at the first pair of slits 86 to form a first fold 100 with the first edge 80 of the second trim member positioned adjacent to the central region 78. The first pair of slits 86 are positioned and located to locate the first fold 100. As such, the first and second series of apertures 90, 92 are aligned with one another.

The second side region 72 of the second trim member is folded at the second pair of slits 88 to form a second fold 102 with the second edge 82 of the second trim member positioned adjacent to the central region 78. The second pair of slits 88 are positioned and located to locate the second fold 102. As such, the third and fourth series of apertures 94, 96 are aligned with one another.

In a fourth step, a first seam 104 is sewed adjacent to the first fold 100 with the first side region 70 sewn to itself. The first seam 104 extends from the first end region 74 to the second end region 76 of the second trim member to retain the first fold 100. The first seam 104 may be positioned between the first fold 100 and the first and second series of apertures 90, 92. The seam 104 therefore creates the first fold 100 as a hem, which additionally provides additional material or reinforcement for the second trim member 52.

A second seam 106 is sewed adjacent to the second fold 102 with the second side region 72 sewn to itself. The second seam 106 extends from the first end region 74 to the second end region 76 of the second trim member to retain the second fold 102. The second seam 106 may be positioned between the second fold 102 and the third and fourth series of apertures 94, 96. The seam 106 therefore creates the second fold 102 as a hem, which additionally provides additional material or reinforcement for the second trim member 52.

Referring to FIG. 5, in a fifth step, the second trim member 52 is arranged or positioned on the first trim member 50. The second trim member 52 is arranged or positioned on the second surface 60, or B-face, of the first trim member 50. The second surface of the second trim member 52 is placed in contact with the second surface 60 of the first trim member 50. The second trim member 52 is arranged after folding and sewing the first and second seams 104, 106. The The pair of tabs 84 on the second trim member 52 cooperate with the pair of notches 62 on the first trim member 50 to position or locate the second trim member relative to the first trim member. The pair of tabs 84 are positioned into the pair of notches 62. The pair of notches 62 may be aligned or located relative to a pattern on the first surface 58 of the first trim member, and may also be located based on a corresponding location of a groove 24 of a seat member intended for use with the trim assembly.

In a sixth step, the first end region 74 of the second trim member is sewed or otherwise connected to the first trim member 50 at a location adjacent to the first edge 54 of the first trim member. The first end region 74 is sewn or otherwise attached to the first trim member 50 from the second surface 60 of the first trim member to form a third seam 108 as is shown in FIG. 5. By sewing the third seam 108 from the second surface 60 of the first trim member 50, a sewing needle enters the second and first trim members 52, 50 sequentially and from the second surface 60 of the first trim member 50 to begin the seam 108, e.g. the second trim member 52 is positioned between the first trim member 50 and the needle before the needle enters the trim members 50, 52 and the seam 108 is sewn.

The second end region 76 of the second trim member is sewed or otherwise connected to first trim member 50 at a location adjacent to the second edge 56 of the first trim member. The second end region 76 is sewn or otherwise attached to the first trim member 50 from the second surface 60 of the first trim member to form a fourth seam 110 as is shown in FIG. 5. By sewing the fourth seam 110 from the second surface 60 of the first trim member 50, a sewing needle enters the second and first trim members 52, 50 sequentially and from the second surface 60 of the first trim member 50 to begin the seam 110, e.g. the second trim member 52 is positioned between the first trim member 50 and the needle before the needle enters the first and second trim members 50, 52 and the seam 110 is sewn.

Arranging the second trim member 52 is performed prior to sewing the first and second end regions of the second trim member to the first trim member and forming the third and fourth seams 108, 110.

In a seventh step, the first trim member 50 and second trim member 52 are then turned over such that the first surface 58 is facing upwards as shown in FIG. 1, and the central region 78 of the second trim member 52 is sewed or otherwise connected to the first trim member 50 from the first surface 58 of the first trim member 50 from this orientation via a fifth seam 112. By sewing the fifth seam 112 from the first surface 58 of the first trim member 50, a sewing needle enters the first and second trim members 50, 52 sequentially and from the first surface 58 of the first trim member 50 to begin the seam 112, e.g. the first trim member 50 is positioned between the second trim member 52 and the needle before the needle enters the trim members 50, 52 and the seam 112 is sewn.

The first and second side regions 70, 72 then extend away from the first trim member 50 to separate free ends ending in the folds 100, 102.

Sewing the central region 78 forms the fifth seam 112, such as decorative seam as shown in FIG. 1, that extends from the first end region 74 to the second end region 76 of the second trim member 52 and also across the first trim member 50. The decorative seam 112 may therefore be aligned with the pattern on the first surface 58 of the first trim member. Therefore, the fifth seam 112 may be provided as a decorative seam as shown in FIG. 1, that is sewn from the first surface 58, or A-face, of the first trim member. Sewing the central region 78 and forming the fifth seam 112 is performed subsequent to sewing the first and second end regions 74, 76 and forming the third and fourth seams 108, 110.

As shown in FIG. 5, and according to one non-limiting example, the fifth seam 112 extends substantially transversely to the third and fourth seams 108, 110. The fifth seam 112 extends generally parallel to the first and second seams 104, 106. As used herein and for purposes of this disclosure, "substantially" means within five degrees or ten degrees more or less than the desired orientation.

As shown in FIG. 6, in an eighth step, the first and second side regions 70, 72 of the second trim member 52 are then sewn to one another to form a sixth seam 114. The sixth seam 114 may extend from the first end region 74 to the second end region 76 of the second trim member. The sixth seam 114 may be sewn adjacent to the first and second folds 100, 102 of the second trim member.

The sixth seam 114 is spaced apart from the fifth seam 112, and is sewn subsequent to the fifth seam 112. The sixth seam 114 extends through multiple layers of the second trim member 52 only. The fifth and sixth seams 112, 114 may be substantially parallel to one another. The first and second folds 100, 102 (or first and second hems), as well as the first and second seams 104, 106 and sixth seam 114 provide support and strength for the second trim member 52 with respect to a fastener, such as a hog ring to provide resistance against pulling or tearing.

The first and second side regions 70, 72 are therefore connected to one another and extend away from the first trim member 50. The first, second, third, and fourth series of apertures 90, 92, 94, 96 are positioned to align with one another as is shown in FIG. 6.

In a ninth step, the trim assembly 30 is connected to a seat member, such as the cushion 20 and seat member 14 shown in FIG. 2. The first and second side regions 70, 72 of the second trim member extend outwardly from the first trim member 50 and are positioned into or received by one of the grooves 24 defined by a vehicle seat member. The first and second side regions 70, 72 are then connected to the vehicle seat member 14 to locate and retain the trim assembly 30 and first trim member 50 relative to the vehicle seat member. As the second trim member 52 has been located relative to the first trim member 50 and any patterns associated therewith, the pattern on the first surface 58 of the first trim member and fifth, decorative seam 112 are aligned with the contour of the trim assembly 30 when it is connected to the groove 24.

In one example, the vehicle seat assembly 10 further comprises a series of fasteners, each fastener extending through the seat member 14 and through respective apertures of the series of apertures 90, 92, 94, 96 to connect the second trim member 52 to the seat member at the groove 24. The first, second, third, and fourth series of apertures 90, 92, 94, 96 are sized to receive the series of fasteners to connect the second trim member 52 to an underlying support surface of a seat.

In one example, the series of fasteners further comprises rings, such as hog rings. In other examples, other fasteners may likewise be used with the apertures.

In another example, the second trim member 52 is provided without the series of apertures 90, 92, 94, 96. In this example, the first side region and/or the second side region of the second trim member 52 is provided with one of a hook fastener and a loop fastener. The groove 24 of the seat member is provided with the other of the hook fastener and the loop fastener positioned within the groove. The hook fastener cooperating with the loop fastener to connect side regions of the second trim member 52 to the cushion 20, and secure the trim assembly 30 to the seat member 14.

While exemplary embodiments are described above, it is not intended that these embodiments describe all possible forms of the disclosure and invention. Rather, the words used in the specification are words of description rather than limitation, and it is understood that various changes may be made without departing from the spirit and scope of the disclosure. Additionally, the features of various implementing embodiments may be combined to form further embodiments of the invention.

What is claimed is:

1. A vehicle seat assembly comprising:
   a seat member with a seating surface, the seating surface defining a groove extending thereacross; and
   a first trim member having a first edge and a second edge opposite to the first edge, and a first surface and a second surface opposite to the first surface, the first surface extending between the first and second edges, the second surface in contact with the seat member; and
   a one-piece second trim member comprising a first side region defining a first edge of the second trim member and a second side region defining a second edge of the second trim member, wherein the second trim member comprises a central region extending continuously between the first and second side regions, and each of the first and second side regions extending from a first end region to a second end region of the second trim member, wherein the first end region is connected to the first trim member adjacent to the first edge of the first trim member, and wherein the second end region is connected to the first trim member adjacent to the second edge of the first trim member;
   wherein the central region of the second trim member is connected to the second surface of the first trim member via a first seam extending from the first end region to the second end region of the second trim member;
   wherein the first and second side regions are sewn to one another and extend away from the first trim member; and
   wherein the first and second side regions of the second trim member are received into the groove and are connected to the seat member.

2. The vehicle seat assembly of claim 1 wherein the first side region of the second trim member defines a first series of apertures spaced apart from one another and extending from the first end region to the second end region of the second trim member;
   wherein the second side region of the second trim member defines a second series of apertures spaced apart from one another and extending from the first end region to the second end region of the second trim member, the second series of apertures aligned with the first series of apertures; and
   wherein the vehicle seat assembly further comprises a series of fasteners, each fastener extending through the seat member and through respective apertures of the first and second series of apertures to connect the second trim member to the seat member.

3. The vehicle seat assembly of claim 2 wherein the series of fasteners further comprises rings.

4. The vehicle seat assembly of claim 1 wherein the first side region of the second trim member is provided with one of a hook fastener and a loop fastener; and
   wherein the seating surface of the seat member is provided with the other of the hook fastener and the loop fastener positioned within the groove, the hook fastener cooperating with the loop fastener to connect the second trim member to the seat member.

5. A trim cover assembly comprising:
   a first trim member having a first edge and a second edge opposite to the first edge, and a first surface and a second surface opposite to the first surface, the first surface extending between the first and second edges to form a seating surface; and
   a one-piece second trim member for connection to a seat member, the second trim member having a first side region defining a first edge of the first trim member and a second side region opposite thereto defining a second edge of the second trim member, wherein the second trim member comprises a central region extending continuously between the first and second side regions, and each of the first and second side regions extending from a first end region to a second end region of the second trim member, wherein the first end region is connected to the first trim member adjacent to the first edge of the first trim member, and wherein the second end region is connected to the first trim member adjacent to the second edge of the first trim member;
   wherein the central region of the second trim member is connected to the second surface of the first trim member via a first seam extending from the first end region to the second end region of the second trim member; and
   wherein the first and second side regions are sewn to one another and extend away from the first trim member.

6. The trim assembly of claim 5 wherein the first end region is connected to the first trim member adjacent to the first edge via a second seam; and
   wherein the second end region is connected to the first trim member adjacent to the second edge via a third seam; and
   wherein the first seam extends substantially transversely to the second and third seams.

7. The trim assembly of claim 5 wherein the first side region defines a first edge of the second trim member, the first edge of the second trim member positioned adjacent to the central region to form a first fold; and
   wherein the second side region defines a second edge of the second trim member, the second edge of the second trim member positioned adjacent to the central region to form a second fold.

8. The trim assembly of claim 7 wherein the second trim member defines a first slit and a second slit extending inwardly from the first and second end regions, respectively, the first and second slits positioned between the central region and the first edge of the second trim member, the first and second slits positioned to locate the first fold.

9. The trim assembly of claim 7 wherein the first fold and the second fold are connected to one another via a second seam extending through the second trim member adjacent to the first and second folds.

10. The trim assembly of claim 5 wherein the first side region defines a first series of apertures spaced apart from one another;
wherein the second side region defines a second series of apertures spaced apart from one another; and
wherein the first and second series of apertures are positioned to align with one another, and are sized to receive a series of fasteners to connect the second trim member to an underlying support surface of a seat.

11. The trim assembly of claim 5 wherein the first and second edges of the first trim member forms one of a pair of opposed notches and a pair of opposed tabs, respectively;
wherein the first and second end regions of the second trim member form the other of the pair of opposed notches and the pair of opposed tabs, respectively; and
wherein the pair of opposed notches and the pair of opposed tabs cooperate with one another to locate the second trim member relative to the first trim member when connecting the second trim member to the first trim member.

12. The trim assembly of claim 5 wherein the second trim member is formed from a non-woven fabric.

13. A trim cover assembly comprising:
a first trim member having a first edge and a second edge opposite to the first edge, and a first surface and a second surface opposite to the first surface, the first surface extending between the first and second edges to form a seating surface; and
a second trim member for connection to a seat member, the second trim member having a first side region and a second side region opposite thereto, the first and second side regions each extending between a first end region and a second end region of the second trim member, wherein the first end region is connected to the first trim member adjacent to the first edge of the first trim member, and wherein the second end region is connected to the first trim member adjacent to the second edge of the first trim member;
wherein a central region of the second trim member is connected to the second surface of the first trim member via a first seam extending from the first end region to the second end region of the second trim member, the central region of the second trim member positioned between the first and second side regions of the second trim member;
wherein the first side region defines a first edge of the second trim member, the first edge of the second trim member positioned adjacent to the central region to form a first fold;

wherein the second side region defines a second edge of the second trim member, the second edge of the second trim member positioned adjacent to the central region to form a second fold;
wherein the first fold has a second seam extending from the first end region to the second end region of the second trim member to retain the first fold;
wherein the second fold has a third seam extending from the first end region to the second end region of the second trim member to retain the second fold; and
wherein the first and second side regions are sewn to one another and extend away from the first trim member.

14. The trim assembly of claim 13 wherein the second trim member defines a first slit and a second slit extending inwardly from the first and second end regions, respectively, the first and second slits positioned between the central region and the first edge of the second trim member, the first and second slits positioned to locate the first fold.

15. The trim assembly of claim 13 wherein the first fold and the second fold are connected to one another via a fourth seam extending through the second trim member adjacent to the first and second folds.

16. The trim assembly of claim 13 wherein the first side region defines a first series of apertures spaced apart from one another;
wherein the second side region defines a second series of apertures spaced apart from one another; and
wherein the first and second series of apertures are positioned to align with one another, and are sized to receive a series of fasteners to connect the second trim member to an underlying support surface of a seat.

17. The trim assembly of claim 13 wherein the first and second edges of the first trim member forms one of a pair of opposed notches and a pair of opposed tabs, respectively;
wherein the first and second end regions of the second trim member form the other of the pair of opposed notches and the pair of opposed tabs, respectively; and
wherein the pair of opposed notches and the pair of opposed tabs cooperate with one another to locate the second trim member relative to the first trim member when connecting the second trim member to the first trim member.

18. The trim assembly of claim 13 wherein the first end region is connected to the first trim member adjacent to the first edge via a fourth seam; and
wherein the second end region is connected to the first trim member adjacent to the second edge via a fifth seam; and
wherein the first seam extends substantially transversely to the fourth and fifth seams.

* * * * *